United States Patent
Masuhara et al.

(10) Patent No.: US 10,919,035 B2
(45) Date of Patent: Feb. 16, 2021

(54) MICROCHIP, ANALYSIS APPARATUS, AND ANALYSIS METHOD

(71) Applicant: Sony Corporation, Tokyo (JP)

(72) Inventors: Shin Masuhara, Tokyo (JP); Yoshiaki Kato, Gunma (JP); Ryousuke Minami, Aichi (JP); Toshio Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 15/554,443

(22) PCT Filed: Feb. 24, 2016

(86) PCT No.: PCT/JP2016/000984
§ 371 (c)(1),
(2) Date: Aug. 30, 2017

(87) PCT Pub. No.: WO2016/143278
PCT Pub. Date: Sep. 15, 2016

(65) Prior Publication Data
US 2018/0065119 A1 Mar. 8, 2018

(30) Foreign Application Priority Data

Mar. 6, 2015 (JP) .................. 2015-044948
Jan. 21, 2016 (JP) .................. 2016-009643

(51) Int. Cl.
*G01N 21/05* (2006.01)
*B01L 3/00* (2006.01)
*G01N 21/03* (2006.01)

(52) U.S. Cl.
CPC ... *B01L 3/502707* (2013.01); *B01L 3/502723* (2013.01); *G01N 21/05* (2013.01);
(Continued)

(58) Field of Classification Search
CPC ............................................. G01N 2021/054
See application file for complete search history.

(56) References Cited

U.S. PATENT DOCUMENTS 5,922,604 A    7/1999  Stapleton et al.
8,591,836 B2 * 11/2013  Boege ................. B01L 3/50825
                                                     422/552

(Continued)

FOREIGN PATENT DOCUMENTS

JP    2006-075679 A    3/2006
JP    2006-239538 A    9/2006
(Continued)

*Primary Examiner* — Paul S Hyun
(74) *Attorney, Agent, or Firm* — Wolf, Greenfield & Sacks, P.C.

(57) ABSTRACT

According to some aspects, a microfluidic device is provided, comprising a sample holding chamber; and at least one flow path connected to the sample holding chamber configured to supply liquid into the sample holding chamber, wherein the sample holding chamber includes a first inner surface; and a light irradiation region intersecting the first inner surface and configured to receive light from outside of the sample holding chamber to irradiate liquid inside the sample holding chamber, wherein the first inner surface includes at least one recess shaped so as to contain gas bubbles present within the liquid, and wherein the at least one recess is located outside of the light irradiation region.

17 Claims, 5 Drawing Sheets

(52) U.S. Cl.
CPC . *B01L 3/502715* (2013.01); *B01L 2200/0684* (2013.01); *B01L 2200/16* (2013.01); *B01L 2300/0816* (2013.01); *B01L 2300/0864* (2013.01); *G01N 2021/0378* (2013.01); *G01N 2021/054* (2013.01)

(56) References Cited

U.S. PATENT DOCUMENTS

| | | |
|---|---|---|
| 2002/0155516 A1* | 10/2002 | Dunfee ............... G01N 21/253 435/32 |
| 2008/0280365 A1 | 11/2008 | Grumann et al. |
| 2009/0263288 A1 | 10/2009 | Suzuki et al. |
| 2014/0162373 A1 | 6/2014 | Aoki et al. |

FOREIGN PATENT DOCUMENTS

| | | |
|---|---|---|
| JP | 2006-300741 A | 11/2006 |
| JP | 2007-085998 A | 4/2007 |
| WO | WO 2014/188281 A2 | 11/2014 |

\* cited by examiner

[Fig. 1]
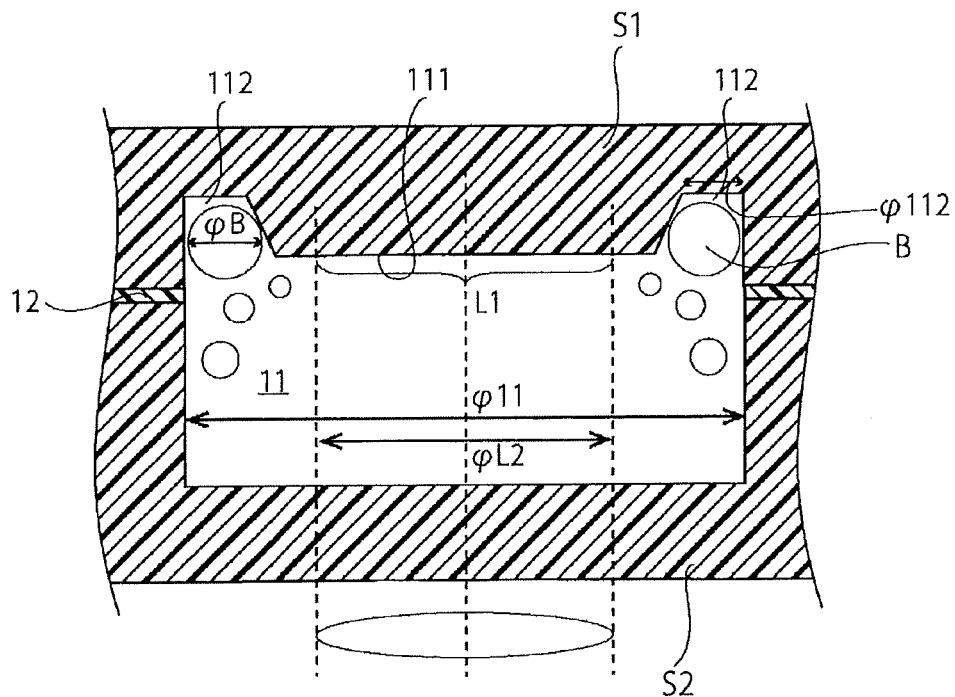
[Fig. 2]
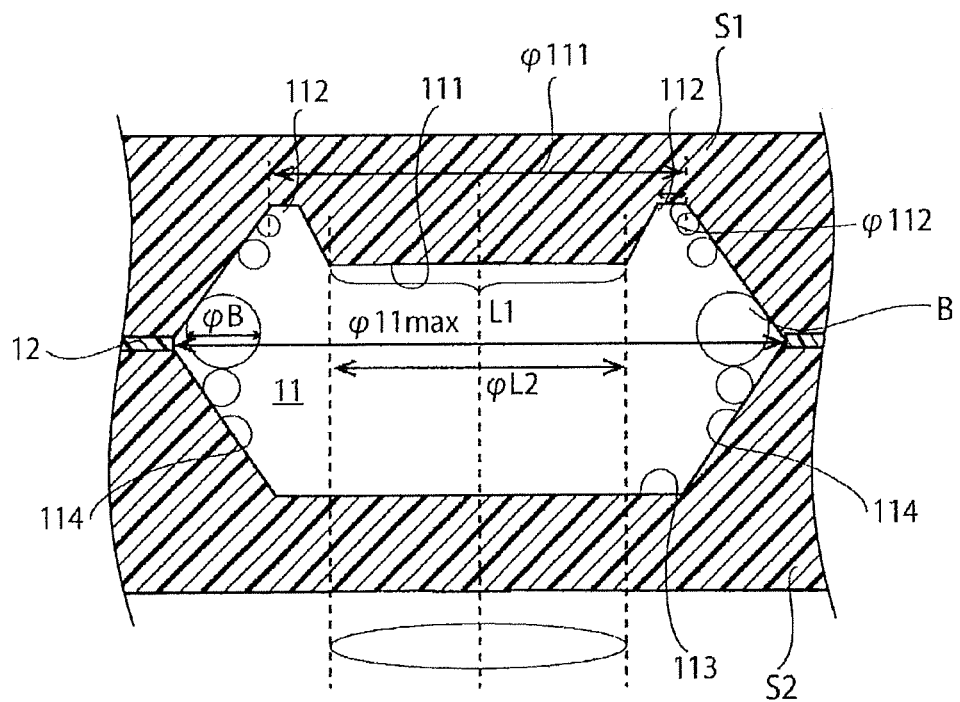

[Fig. 3]
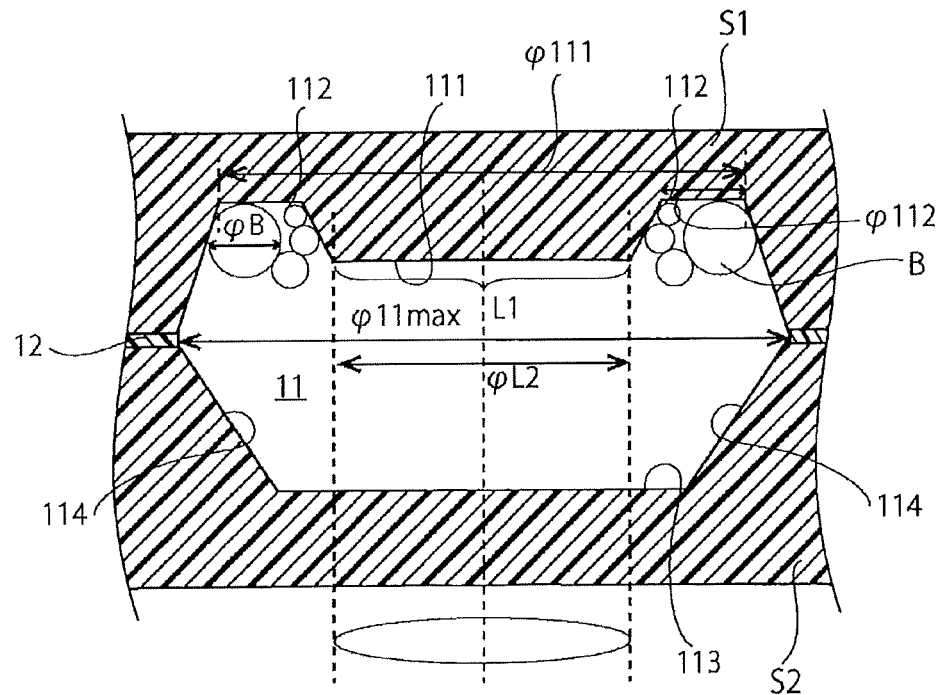
[Fig. 4]
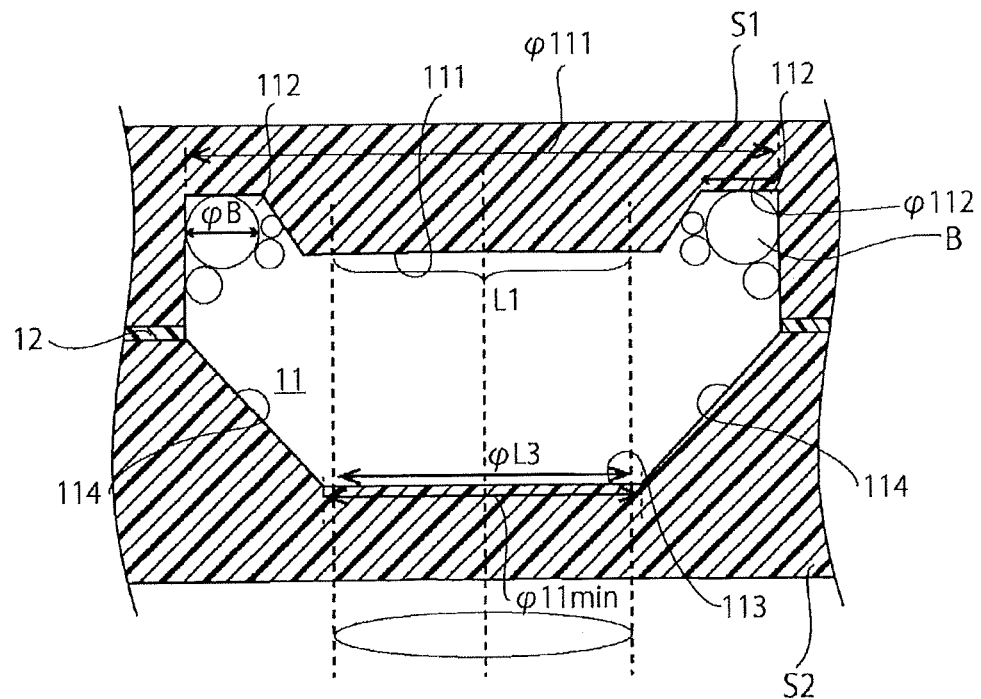

[Fig. 5]
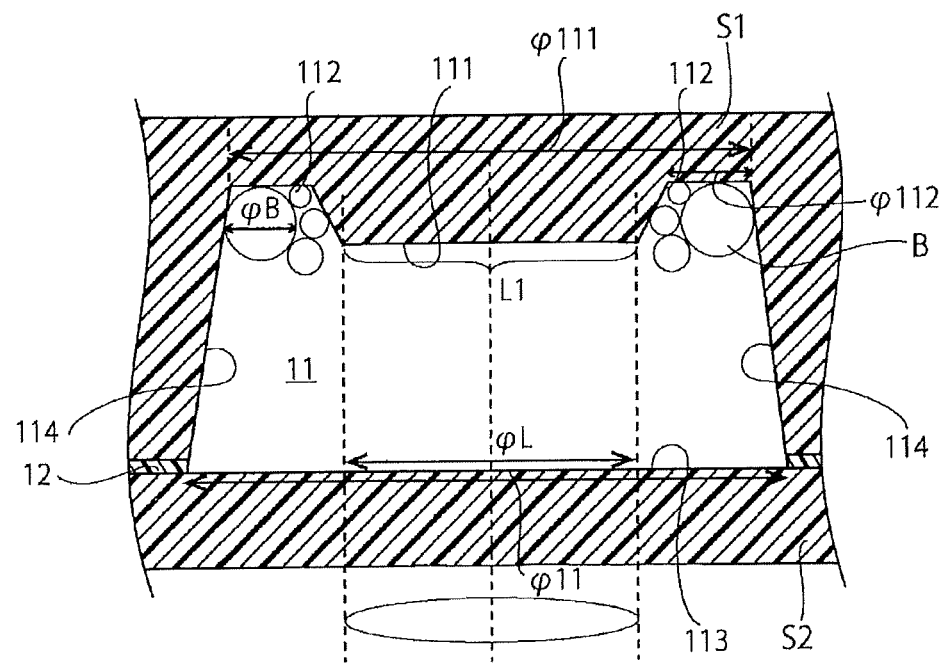
[Fig. 6]
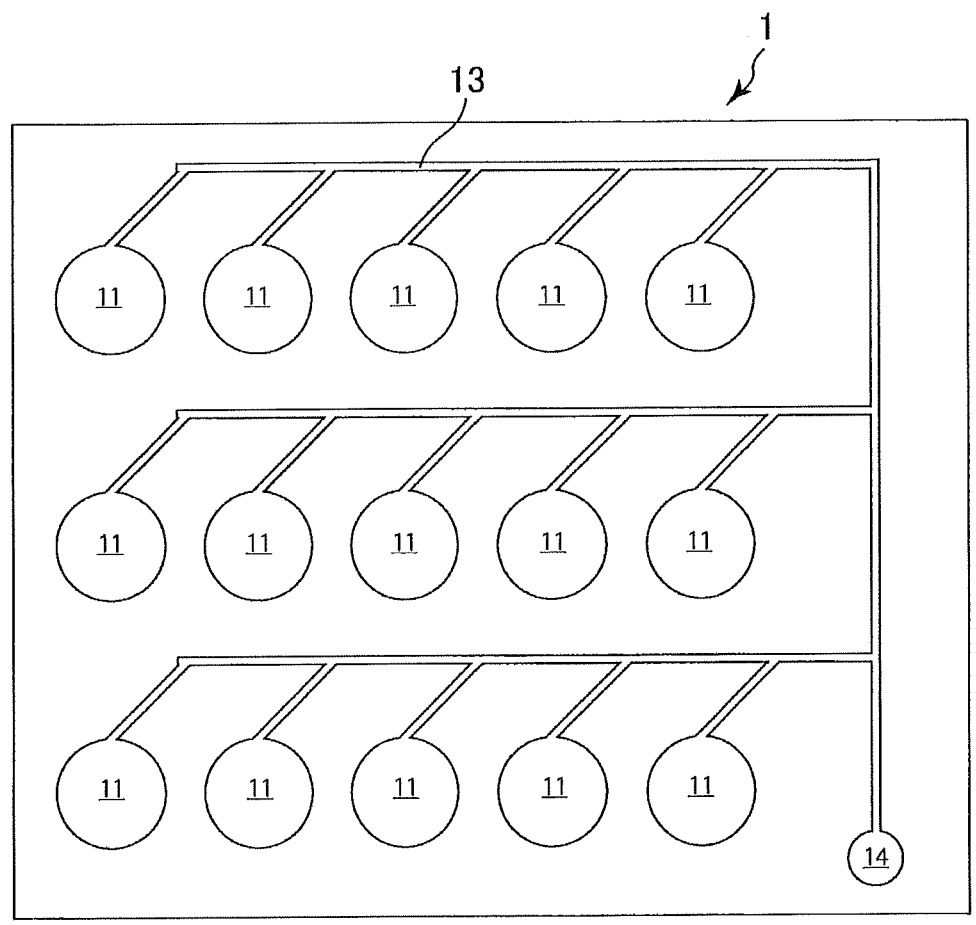

[Fig. 7]
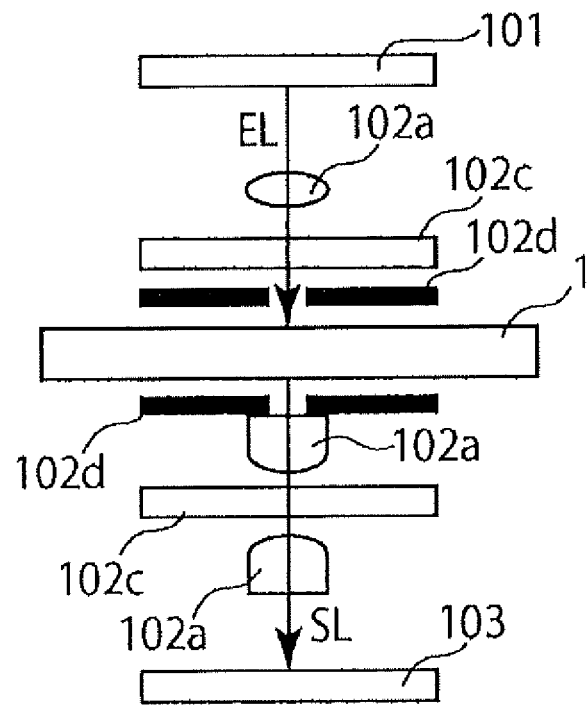
[Fig. 8]
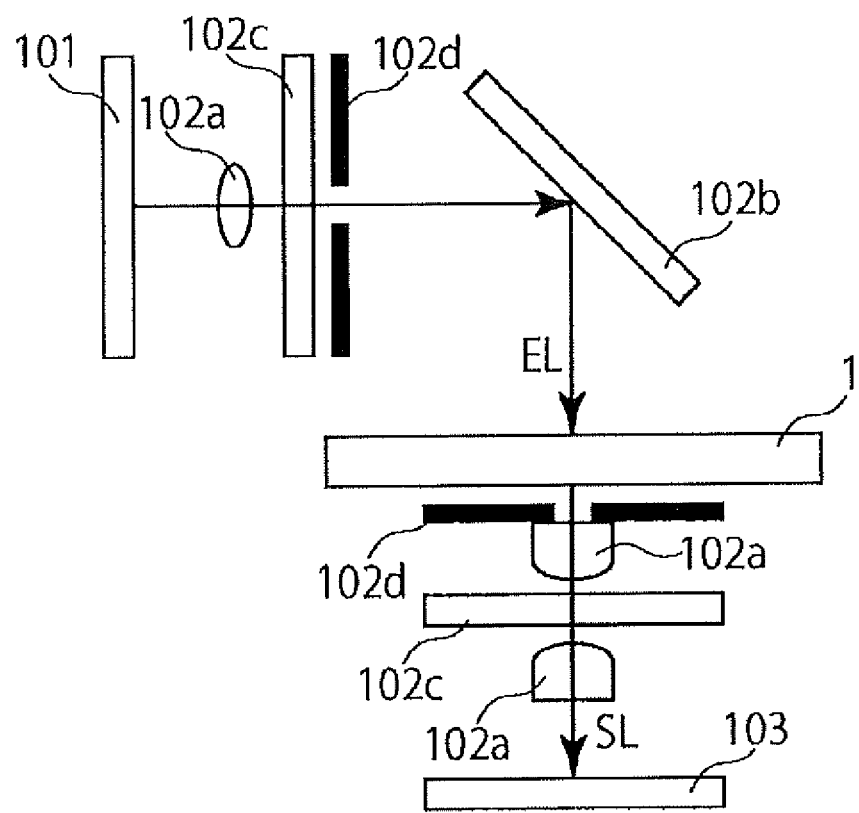

[Fig. 9]
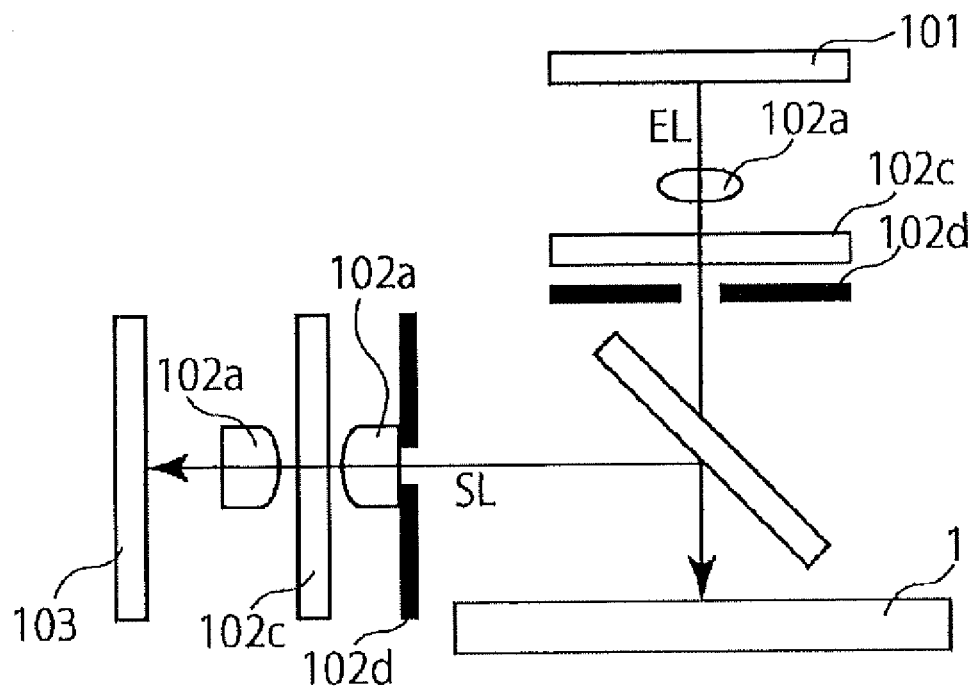
[Fig. 10]
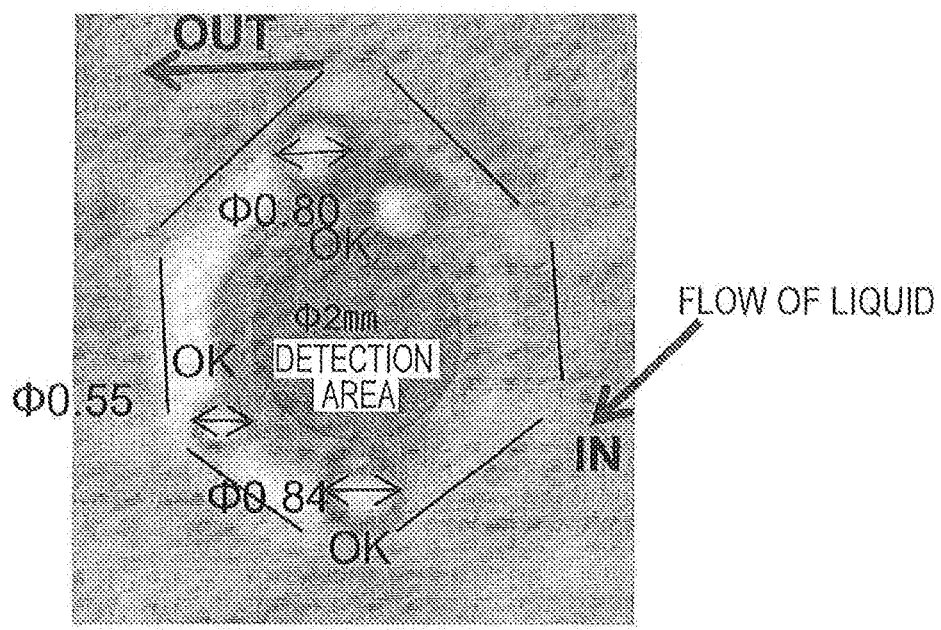

MICROCHIP, ANALYSIS APPARATUS, AND ANALYSIS METHOD

CROSS REFERENCE TO RELATED APPLICATIONS

This Application is a national stage filing under 35 U.S.C. 371 of International Patent Application Serial No. PCT/JP2016/000984, filed Feb. 24, 2016, entitled "MICROCHIP, ANALYSIS APPARATUS, AND ANALYSIS METHOD". Foreign priority benefits are claimed under 35 U.S.C. § 119(a)-(d) or 35 U.S.C. § 365(b) of Japanese Priority Patent Application JP 2015-044948 filed on Mar. 6, 2015, and Japanese Priority Patent Application JP 2016-009643 filed on Jan. 21, 2016, the entire contents of which are incorporated herein by reference.

TECHNICAL FIELD

The present technology relates to a microchip. More specifically, the present technology relates to a microchip, and an analysis apparatus and an analysis method in which analysis is performed using the microchip.

BACKGROUND ART

These days, technology research on gene analysis, protein analysis, cell analysis, etc. is widely advanced in various fields such as the medical field, drug development field, clinical examination field, food field, agriculture field, engineering field, forensic medicine field, and criminal identification field. Particularly nowadays, technology development and practical application of a lab-on-a-chip in which various reactions for the detection, analysis, etc. of nucleic acids, proteins, cells, etc. are performed in a flow path or a well of the microscale provided on a chip are advanced, and are drawing attention as a method for measuring biomolecules, etc. conveniently.

CITATION LIST

Patent Literature

PTL 1: JP 2006-239538A
PTL 2: JP 2007-85998A
PTL 3: JP 2006-300741A

SUMMARY

In such technology of a lab-on-a-chip performed in a flow path or a well of the microscale provided on a chip, development of an apparatus capable of performing various analyses in the actual sites (e.g. medical sites, etc.) is desired, and how to achieve downsizing of the apparatus is an unavoidable issue. Hence, in order to perform detection or analysis efficiently in a compact apparatus, it is desired to make various appropriate modifications to the chip, apparatus, detection or analysis method, etc. used.

Here, such a microchip including a flow path or a well of the microscale has a disadvantage that air bubbles generated in the flow path, etc. constitute an obstacle to accurate analysis. For this disadvantage, many technologies have so far been developed. As an example, there is a method in which deaeration processing of a sample liquid is performed in an earlier stage of the chip.

Furthermore, for example, in PTL 1 there is described a technology on a micro flow path in which at least part of the inner surface of a micro flow path is provided with an air bubble nucleus introduction mechanism that introduces an air bubble nucleus into the liquid flow from the gas existing in the flow path and thereby accurate analysis can be performed with a minute amount of a sample, without being influenced by the generation of air bubbles due to the gas dissolved in the sample. In this technology, as a specific example, an idea of trapping air bubbles by arranging minute features on the side wall of the flow path is described.

Furthermore, for example, in PTL 2 there is described a method in which, in a micro fluid device, the generation of air bubbles is suppressed by a method of optimally controlling the liquid feeding pressure of a liquid sample around the outlet of the main flow path on the basis of a formula of the flow in a tube, such as of a configuration in which a secondary flow path that is kept at a pressure more than or equal to the saturated vapor pressure and has a length satisfying the conditions where the separation of the dissolved gas due to change in temperature or pressure does not occur is connected to the downstream side of the reaction area, a configuration in which a solution that can keep a pressure more than or equal to the saturated vapor pressure under the set temperature conditions, does not cause the separation of the dissolved gas due to change in temperature or pressure under the conditions, and does not mix or is less likely to mix with a sample solution is passed in front of the sample solution to enhance the pressure of the sample solution in the flow path, or a configuration in which a pressure is applied to the pressure from the upstream side, which is generating the flow, from the downstream side, which is on the opposite side to the upstream side, to enhance the pressure in a sample solution.

Moreover, in PTL 3, there is described, as a method for performing an air bubble measure exclusively on an optical detection unit, a technology in which, for the flow path diameter of a sample holding portion where optical measurement is performed, both wall surfaces are expanded with respect to the detection light incident aperture, utilizing the property that air bubbles are generated along the flow path wall.

Technical Problem

Although many methods of adding a deaeration structure in a flow path as in PTLs 1 and 2 described above have been developed, these technologies have had a disadvantage that the complication of the sequence and structure is unavoidable. In addition, the configuration in which a large number of minute pores exist as in PTL 1 has had a disadvantage of being difficult to process and transfer and being not suitable for mass production of chips.

On the other hand, the technology of only expanding the flow path diameter as in PTL 3 described above is convenient and of practical use; but since it is not a structure in which air bubbles are forcedly discharged to the outside of the optical path, it is the actual situation that there is still room for development in the effect of removing air bubbles.

Thus, it is desirable to provide a technology that is a simple method and yet improves the effect of removing air bubbles.

Solution to Problem

According to a first aspect of the present technology, a microfluidic device comprises: a sample holding chamber; and at least one flow path connected to the sample holding chamber configured to supply liquid into the sample holding chamber, wherein the sample holding chamber includes: a first inner surface; and a light irradiation region intersecting the first inner surface and configured to receive light from outside of the sample holding chamber to irradiate liquid inside the sample holding chamber, wherein the first inner surface includes at least one recess shaped so as to contain gas bubbles generated within liquid in the sample holding chamber, and wherein the at least one recess is located outside of the light irradiation region.

According to a second aspect of the present technology, an analysis apparatus comprises: at least one light source; a microchip; and an optical control mechanism configured to guide light from the at least one light source onto the microchip, wherein the microchip comprises: a sample holding chamber; and at least one flow path connected to the sample holding chamber configured to supply liquid into the sample holding chamber, wherein the sample holding chamber includes: a first inner surface; and a light irradiation region intersecting the first inner surface and configured to receive light from the at least one light source to irradiate liquid inside the sample holding chamber, wherein the first inner surface includes at least one recess shaped so as to contain gas bubbles generated within liquid in the sample holding chamber, and wherein the at least one recess is located outside of the light irradiation region.

According to a third aspect of the present technology, a microfluidics analysis method comprises: guiding light from at least one light source onto a microchip, the microchip comprising; a sample holding chamber including a first inner surface; and at least one flow path connected to the sample holding chamber; and delivering liquid into the sample holding chamber via the at least one flow path, wherein the guided light is directed to a light irradiation region intersecting the first inner surface of the sample holding chamber, wherein the first inner surface includes at least one recess shaped so as to contain gas bubbles generated within liquid in the sample holding chamber, and wherein the at least one recess is located outside of the light irradiation region.

According to a fourth aspect of the present technology, a method of manufacturing a microfluidic device comprises: obtaining a first substrate having a first inner surface; obtaining a second substrate having a second inner surface; and attaching the first substrate to the second substrate thereby forming a sample holding chamber, wherein the sample holding chamber includes at least one outlet for delivering liquid into the sample holding chamber, wherein the sample holding chamber includes a light irradiation region intersecting the first inner surface and configured to receive light from outside of the sample holding chamber to irradiate liquid inside the sample holding chamber, wherein the first inner surface includes at least one recess shaped so as to contain gas bubbles generated within liquid in the sample holding chamber, and wherein the at least one recess is located outside of the light irradiation region.

Advantageous Effects of Invention

According to an embodiment of the present technology, although it is a simple method, air bubbles that are an obstacle to optical analysis can be removed efficiently.

The effect described herein is not necessarily a limitative one, and any effect described in the present technology may be exhibited.

BRIEF DESCRIPTION OF DRAWINGS

FIG. 1 is a schematic cross-sectional view schematically showing a first embodiment of a microchip according to the present technology.

FIG. 2 is a schematic cross-sectional view schematically showing a second embodiment of a microchip according to the present technology.

FIG. 3 is a schematic cross-sectional view schematically showing a third embodiment of a microchip according to the present technology.

FIG. 4 is a schematic cross-sectional view schematically showing a fourth embodiment of a microchip according to the present technology.

FIG. 5 is a schematic cross-sectional view schematically showing a fifth embodiment of a microchip according to the present technology.

FIG. 6 is a schematic cross-sectional view schematically showing a sixth embodiment of a microchip according to the present technology.

FIG. 7 is a schematic diagram schematically showing a first embodiment of an analysis apparatus 10 according to the present technology.

FIG. 8 is a schematic diagram schematically showing a second embodiment of an analysis apparatus 10 according to the present technology.

FIG. 9 is a schematic diagram schematically showing a third embodiment of an analysis apparatus 10 according to the present technology.

FIG. 10 is a drawing-substitute photograph that has taken the manner of air bubble generation in Example.

DESCRIPTION OF EMBODIMENTS

Hereinbelow, preferred embodiments of the present technology are described with reference to the drawings. The embodiments described below are illustrated as examples of the typical embodiment of the present technology, and the scope of the present technology should not be construed as being limited by them. The description is given in the following order.

1. Microchip 1
 (1) Sample holding unit 11
 (2) Adhesion layer 12
 (3) Flow path 13
2. Analysis apparatus 10
 (1) Light irradiation unit 101
 (2) Optical control mechanism 102
 (3) Light detection unit 103
 (4) Analysis unit
3. Analysis method <1. Microchip 1>

FIG. 1 is a schematic conceptual view schematically showing a first embodiment of a microchip 1. The microchip 1 according to an embodiment of the present technology is a microchip used for the optical analysis of a sample in a liquid form, and includes at least a sample holding unit 11. The microchip 1 may further include an adhesion layer 12, a flow path 13, etc. as necessary. Each component will now be described in detail.

(1) Sample Holding Unit 11

The sample holding unit 11 holds a sample to be analyzed, and is a region where optical detection can be performed. It may be used also as a standby place where a sample is allowed to stand by for a certain period, as well as for detection, etc., and may be used also as, for example, a reaction place where nucleic acid amplification, hybridization, the inter-substance interaction of nucleic acids, proteins, cells, etc., or the like proceeds. According to some embodiments, the sample holding unit 11 may be an enclosed volume, or "chamber", having one or more openings into and/or out of which a liquid may flow via a flow path. Such a chamber may have any suitable shape and include any number and size of such openings.

The width, depth, and cross-sectional shape of the sample holding unit 11 are not particularly limited, and may be freely designed to the extent that the effect of the present technology is not impaired. For example, the cross-sectional shape may be freely designed to be a circle, a polygon (triangle, quadrangle, or polygon with more angles), an ellipse, a configuration in which one or more of these are combined, etc. Also the shape in the depth direction may be freely designed to be, for example, a circular cylindrical body as in the first embodiment shown in FIG. 1, a polygonal cylindrical body with a polygonal cross section (triangle, quadrangle, or polygon with more angles), a conical body, a polygonal pyramid-like body with a polygonal cross section (triangle, quadrangle, or polygon with more angles), a configuration in which one or more of these are combined, etc., in accordance with the analysis objective, the type of the sample used, etc.

The sample holding unit 11 includes an upper surface 111 of which a part is located on the optical axis during light irradiation. The sample holding unit 11 includes, outside the light irradiation area L1 of the upper surface 111, a recess 112 recessed in the upper surface 111 direction. By the inclusion of the recess 112 outside the light irradiation area L1 of the upper surface 111, air bubbles B generated in the sample holding unit 11 are trapped by the recess 112, and the obstruction by air bubbles in light irradiation and light detection can be prevented.

The upper surface direction of the microchip according to an embodiment of the present technology may be various directions depending on the structure and installation method of the apparatus used for optical analysis, and may be, for example, the opposite direction to the gravity direction.

The recess 112 is preferably designed such that the short diameter $\varphi 112$ of the cross section orthogonal to the gravity direction is longer than or equal to the diameter $\varphi B$ of the air bubble B that is expected to be generated in the sample. That is, the condition of Mathematical Formula (1) below is preferably satisfied. By designing the short diameter $\varphi 112$ to longer than or equal to the diameter $\varphi B$ of the air bubble B, the recess 112 can surely trap the air bubble B generated in the sample holding unit 11.

[Math.1]

$$\varphi 112 \geq \varphi B \quad (1)$$

According to some embodiments, a diameter $\varphi B$ of an air bubble expected to be generated in a sample may be between 0.5 mm and 3 mm, between 0.8 mm and 2.5 mm, between 1 mm and 2 mm, greater than 0.5 mm, or less than 3 mm. The short diameter $\varphi 112$ may be sized to be equal to or greater than the diameter of an air bubble, and accordingly the short diameter $\varphi 112$ may be greater than 0.5 mm, between 0.8 mm and 4 mm, between 1 mm and 3 mm, greater than 1 mm, greater than 2 mm, or greater than 3 mm.

The sample holding unit 11 is preferably designed such that the maximum diameter $\varphi 11 max$ of the cross section orthogonal to the gravity direction is longer than or equal to the sum of the diameter $\varphi L2$ of the light irradiation area of the cross section having the maximum diameter $\varphi 11 max$ and twice the diameter $\varphi B$ of the air bubble that is expected to be generated in the sample. That is, the condition of Mathematical Formula (2) below is preferably satisfied.

[Math.2]

$$\varphi 11 max \geq \varphi L2 + \varphi B \times 2 \quad (2)$$

According to some embodiments, a diameter $\varphi L2$ of the light irradiation area may be between 1 mm and 2 mm, between 1.2 mm and 1.8 mm, between 1.4 mm and 1.6 mm, greater than 1 mm, or less than 3 mm. According to some embodiments, the diameter $\varphi 11 max$ may be between 2 mm and 7 mm, between 3 mm and 6 mm, between 4 mm and 5 mm, greater than 2 mm, or less than 7 mm. According to some embodiments, the height of the chamber may be between 0.5 mm and 3 mm, between 1 mm and 2.5 mm, between 1.5 mm and 2 mm, greater than 0.5 mm, less than 3 mm, or less than 4 mm.

As an example other than the first embodiment satisfying the condition of Mathematical Formula (2) above, a second embodiment shown in FIG. 2 may be given. The second embodiment is a structure in which the side wall 114 expands once and contracts from the bottom surface 113 toward the upper surface 111 of the sample holding unit 11. In the second embodiment, although the short diameter $\varphi 112$ of the cross section of the recess 112 orthogonal to the gravity direction is less than the diameter $\varphi B$ of the air bubble B, the maximum diameter $\varphi 11 max$ of the cross section of the sample holding unit 11 orthogonal to the gravity direction is longer than or equal to the sum of the diameter $\varphi L2$ of the light irradiation area of the cross section having the maximum diameter $\varphi 11 max$ and twice the diameter $\varphi B$ of the air bubble that is expected to be generated in the sample. Therefore, relatively large air bubbles B are trapped by a portion of the side wall 114 with the maximum diameter $\varphi 11 max$, and relatively small air bubbles B are trapped by the recess 112.

Thus, when a portion where the maximum diameter $\varphi 11 max$ of the cross section of the sample holding unit 11 orthogonal to the gravity direction is longer than or equal to the sum of the diameter $\varphi L2$ of the light irradiation area of the cross section having the maximum diameter $\varphi 11 max$ and twice the diameter $\varphi B$ of the air bubble that is expected to be generated in the sample is included, the air bubble B can be trapped also by the side wall 114.

The upper surface 111 is preferably designed such that the long diameter $\varphi 111$ orthogonal to the gravity direction is longer than or equal to the sum of the diameter $\varphi L1$ of the light irradiation area of the upper surface and twice the diameter $\varphi B$ of the air bubble B that is expected to be generated from the sample. That is, the condition of Mathematical Formula (3) below is preferably satisfied.

[Math.3]

$$\varphi 111 \geq \varphi L1 + \varphi B \times 2 \quad (3)$$

By designing the long diameter $\varphi 111$ of the upper surface 111 orthogonal to the gravity direction to longer than or equal to the sum of the diameter $\varphi L1$ of the light irradiation area of the upper surface and twice the diameter $\varphi B$ of the air bubble B that is expected to be generated from the sample, the air bubble B can be trapped more surely by the upper surface 111, while benefiting from the effect of the recess 112 of the upper surface 111.

For example, in the second embodiment shown in FIG. 2 described above, the long diameter $\varphi 111$ of the upper surface 111 orthogonal to the gravity direction is less than the sum of the diameter $\varphi L1$ of the light irradiation area of the upper surface and twice the diameter $\varphi B$ of the air bubble B that is expected to be generated from the sample; but even in a similar configuration, by setting the long diameter $\varphi 111$ of the upper surface 111 orthogonal to the gravity direction to longer than or equal to the sum of the diameter $\varphi L1$ of the light irradiation area of the upper surface and twice the diameter $\varphi B$ of the air bubble B that is expected to be generated from the sample as in a third embodiment shown in FIG. 3, the air bubble B can be trapped more surely on the upper surface 111 even when relatively large air bubbles B have failed to be trapped in the portion of the side wall 114.

The sample holding unit 11 may be designed such that the area of the cross section orthogonal to the gravity direction varies with the position in the gravity direction. As examples, the second embodiment and the third embodiment shown in FIG. 2 and FIG. 3 described above and the like are given.

As another example, as in a fourth embodiment shown in FIG. 4, the area of the cross section of the sample holding unit 11 orthogonal to the gravity direction may be formed larger upward in the gravity direction. By thus forming the side wall 114 in a tapered shape of expanding from the bottom surface 113 toward the upper surface 111 of the sample holding unit 11, the air bubble B generated in the sample holding unit 11 rises toward the upper surface 111 along the oblique surface of the side wall 114, and the air bubble B can be trapped more surely on the upper surface 111.

Conversely, as in a fifth embodiment shown in FIG. 5, the area of the cross section of the sample holding unit 11 orthogonal to the gravity direction may be formed smaller upward in the gravity direction. As long as the recess 112 is thus provided outside the light irradiation area L1 of the upper surface 111, even when the side wall 114 is formed in a tapered shape of contracting from the bottom surface 113 toward the upper surface 111 of the sample holding unit 11, the air bubble B generated in the sample holding unit 11 rises toward the upper surface 111 along the oblique surface of the side wall 114, and the air bubble B can be trapped in the recess 112 of the upper surface 111.

The sample holding unit 11 is preferably designed such that the minimum diameter φ11min of the cross section orthogonal to the gravity direction is longer than or equal to the diameter φL3 of the light irradiation area of the cross section having the minimum diameter φ11min. That is, the condition of Mathematical Formula (4) below is preferably satisfied.
[Math.4]

$$\varphi 11 min \geq \varphi L3 \tag{4}$$

For example, the minimum diameter φ11min of the cross section of the sample holding unit 11 orthogonal to the gravity direction of the fourth embodiment shown in FIG. 4 is the diameter of the bottom surface 113; by designing the minimum diameter φ11min to longer than or equal to the diameter φL3 of the light irradiation area, light does not go across the side wall 114, and therefore the refraction of the applied light due to the side wall 114, etc. can be prevented.

The specific method for configuring the sample holding unit 11 described above is not particularly limited; for example, by forming the microchip 1 out of a plurality of substrates S(S1 and S2), scooping out part of the substrates S1 and S2 in a recess shape, and performing stacking, the space created between the substrate S1 and the substrate S2 can be formed as the sample holding unit 11.

The material that forms the substrate S is not particularly limited, and usually materials that can be used for chips for light detection such as chips for bioassay or the like may be freely selected for use. For example, a substrate of a plastic resin such as a polycarbonate, a polyolefin-based material, or an acrylic-based material having light transmissivity, a silicon-based resin such as polydimethylsiloxane (PDMS), glass, etc. may be used.

(2) Adhesion Layer 12

The microchip 1 according to an embodiment of the present technology may include the adhesion layer 12 in order to make adhesion between members such as the substrates S. The adhesion layer 12 is not essential in an embodiment of the present technology, and the adhesion may be made by surface-treating the surface of the substrate S into an adhesive surface.

The material that forms the adhesion layer 12 is not particularly limited, and usually materials that can be used for chips for light detection such as chips for bioassay and have adhesiveness may be freely selected for use. For example, the following materials may be given: a silicon-based resin such as polydimethylsiloxane (PDMS); a plastic material such as polypropylene, a polycarbonate, polyethylene terephthalate, and polyethylene capable of being bonded by thermocompression; a thermoplastic material such as a styrene-ethylene-butylene-styrene copolymer (SEBS); and the like.

(3) Flow Path 13

FIG. 6 is a schematic plan view schematically showing a sixth embodiment of the microchip according to the present technology as viewed from above. The microchip 1 according to an embodiment of the present technology may include the flow path 13 as in the sixth embodiment. The configuration of the flow path 13 is not particularly limited; and a substrate S of which a part is scooped out in a concave shape corresponding to the shape of the flow path 13 may be stacked with another substrate S, and the space created between the substrates S may be formed as the flow path 13, similarly to the sample holding unit 11 described above.

The flow path width, flow path depth, and flow path cross-sectional shape of the flow path 13 are not particularly limited, and may be freely designed. For example, a micro flow path with a flow path width of 1 mm or less or the like may be used for the microchip 1 according to an embodiment of the present technology.

The flow path 13 may be used as a path through which a sample flows, and furthermore optical detection, etc. may be performed while a sample is moved through the flow path 13. It is also possible to advance each reaction while moving a sample through the flow path 13 and perform detection, etc. at the time when the sample has reached the sample holding unit 11.

<2. Analysis Apparatus 10>

The microchip 1 according to an embodiment of the present technology described above can be suitably used for an apparatus for optically analyzing a sample in a liquid form. The structure of an analysis apparatus 10 is not particularly limited to the extent that optical measurement can be performed using the microchip 1 according to an embodiment of the present technology, and various structures employed in known optical analysis apparatuses may be employed.

FIG. 7 is a schematic diagram schematically showing a first embodiment of the analysis apparatus 10 according to the present technology. The analysis apparatus 10 according to an embodiment of the present technology may include, for example, a light irradiation unit 101, an optical control mechanism 102, a light detection unit 103, an analysis unit 104, etc.

(1) Light Irradiation Unit 101

The light irradiation unit 101 applies light to a sample held by the sample holding unit 11 of the microchip 1. In the analysis apparatus 10 according to an embodiment of the present technology, the light irradiation method that may be used for the light irradiation unit 101 is not particularly limited, and known light irradiation methods may be freely selected for use. For example, one or more types of light irradiation methods using a light emitting diode (LED), a semiconductor laser, an EL lighting, or the like may be freely selected for use.

The specific method for placing the light irradiation unit 101 is not particularly limited to the extent that light can be applied to a sample, and the placement may be freely made. For example, as in the first embodiment shown in FIG. 7, light irradiation may be performed from above the microchip 1, or although not illustrated, light irradiation may be performed form below the microchip 1.

The light irradiation unit 101 may be freely set in accordance with the function of the optical control mechanism 102 described later. For example, when a dichroic mirror or the like is used as the optical control mechanism 102 as in a second embodiment shown in FIG. 8, light irradiation may be performed from the lateral side of the microchip 1.

The light irradiation unit 101 may be provided for each sample holding unit 11; but when a light splitting element, a light guide plate, or the like is used as the optical control mechanism 102 described later, a design in which one light irradiation unit 101 performs light irradiation on a plurality of sample holding units 11 is possible.

(2) Optical Control Mechanism 102

The analysis apparatus 10 according to an embodiment of the present technology may include the optical control mechanism 102. The optical control mechanism 102 is a mechanism that controls the optical path of the light (excitation light EL) emitted from the light irradiation unit 101 described above.

As the optical control mechanism 102, one or more types of control mechanisms used for known optical analysis apparatuses may be freely combined for use. For example, a lens 102a such as a collimator lens or a condensing lens, a mirror 102b such as a dichroic mirror, an optical filter 102c, an aperture 102d, or the like, or although not illustrated, a light splitting element, a light guide plate, a diaphragm, or the like may be used as necessary.

(3) Light Detection Unit 103

The light detection unit 103 detects the light (e.g. scattered light SL) emitted from a sample by light irradiation. In the analysis apparatus 10 according to an embodiment of the present technology, the light detection method that may be used for the light detection unit 103 is not particularly limited, and known light detection methods may be freely selected for use. For example, a method using an area imaging element such as a photo diode (PD), a charge-coupled device (CCD), or a complementary metal oxide semiconductor (CMOS), a method using what is called a multichannel photodetector in which a plurality of photodetectors are arranged in an array configuration, etc. may be employed.

The specific method for placing the light detection unit 103 is not particularly limited to the extent that the light from a sample can be detected, and the placement may be made freely. For example, light detection may be performed from below the microchip 1 as in the first embodiment shown in FIG. 7, or although not illustrated, light detection may be performed from above the microchip 1.

The light detection unit 103 may be freely set in accordance with the function of the optical control mechanism 102 described above. For example, when a dichroic mirror or the like is used as the optical control mechanism 102 as in a third embodiment shown in FIG. 9, light detection may be performed from the lateral side of the microchip 1.

The light detection unit 103 may be provided for each sample holding unit 11, but a design in which light detection is performed from a plurality of sample holding units 11 by scanning one light detection unit 103 is possible.

(4) Analysis Unit

The analysis apparatus 10 according to an embodiment of the present technology may include an analysis unit. In the analysis unit, analysis for a sample is performed on the basis of the optical information detected by the light detection unit 103. The analysis unit is not essential in the analysis apparatus 10 according to an embodiment of the present technology, and it is also possible to perform analysis using an external analysis apparatus or the like, for example.

<3. Analysis Method>

The microchip 1 according to an embodiment of the present technology described above can be suitably used for a method for optically analyzing a sample in a liquid form. The specific process of the analysis method is not particularly limited to the extent that optical measurement can be performed using the microchip 1 according to an embodiment of the present technology, and various processes performed by known optical analysis methods may be performed. The various processes that may be performed in the analysis method according to an embodiment of the present technology are the same as the methods performed by the parts of the analysis apparatus 10 described above, and a description is omitted here.

Example

The present technology will now be described in more detail on the basis of Example. The Example described below is illustrated as an example of the typical Example of the present technology, and the scope of the present technology should not be construed as being limited by it.

In the Example, the manner in which air bubbles were generated was observed using the microchip 1 according to the fourth embodiment shown in FIG. 4 described above. The diameter of detection light in the Example was set to 1 mm.

<Shape of the Sample Holding Unit>

The minimum diameter $\varphi 11min$ of the cross section of the sample holding unit 11 orthogonal to the gravity direction was designed to 2.2 mm, the maximum diameter $\varphi 11max$ to 3.6 mm, the long diameter $\varphi 111$ of the upper surface 111 orthogonal to the gravity direction to 2.6 mm, and the short diameter $\varphi 112$ of the cross section of the recess orthogonal to the gravity direction to 0.5 mm.

<Method and Result>

A buffer solution for PCR at normal temperature was injected to investigate the manner in which air bubbles were actually generated.

The result is shown in FIG. 10. FIG. 10 is a drawing-substitute photograph that has taken the manner of air bubble generation in Example. As shown in FIG. 10, it has been found that even air bubbles of the maximum, approximately 0.8 mm, among the generated air bubbles were trapped outside the optical detection area.

Additionally, the present technology may also be configured as below.

(1)

A microchip used for optical analysis of a sample in a liquid form, the microchip including:

a sample holding unit including an upper surface of which a part is located on an optical path during light irradiation and configured to hold the sample during the light irradiation, wherein the sample holding unit includes a recess recessed in an upper surface direction outside a light irradiation area of the upper surface.

(2)
The microchip according to (1),
wherein the upper surface direction is an opposite direction to a gravity direction.

(3)
The microchip according to (2),
wherein a short diameter of a cross section of the recess orthogonal to the gravity direction is longer than or equal to a diameter of an air bubble that is expected to be generated in the sample.

(4)
The microchip according to (2) or (3),
wherein a maximum diameter of a cross section of the sample holding unit orthogonal to the gravity direction is longer than or equal to a sum of a diameter of a light irradiation area of a cross section having the maximum diameter and twice a diameter of an air bubble that is expected to be generated in the sample.

(5)
The microchip according to any of (2) to (4),
wherein a long diameter of the upper surface orthogonal to the gravity direction is longer than or equal to a sum of a diameter of a light irradiation area of the upper surface and twice a diameter of an air bubble that is expected to be generated from the sample.

(6)
The microchip according to any of (2) to (5),
wherein the sample holding unit has a portion where an area of a cross section orthogonal to the gravity direction varies with a position in the gravity direction.

(7)
The microchip according to (6),
wherein the area of the cross section of the sample holding unit orthogonal to the gravity direction is formed larger upward in the gravity direction.

(8)
The microchip according to any of (2) to (7),
wherein a minimum diameter of a cross section of the sample holding unit orthogonal to the gravity direction is longer than or equal to a diameter of a light irradiation area of a cross section having the minimum diameter.

(9)
The microchip according to any of (1) to (8), further including:
a flow path configured to communicate with the sample holding unit.

(10)
An analysis apparatus that optically analyzes a sample in a liquid form, the analysis apparatus performing analysis using a microchip including a sample holding unit including an upper surface of which a part is located on an optical path during light irradiation and configured to hold the sample during the light irradiation,
wherein the sample holding unit includes a recess recessed in an upper surface direction outside a light irradiation area of the upper surface.

(11)
An analysis method for optically analyzing a sample in a liquid form, the analysis method including:
performing analysis using a microchip including a sample holding unit including an upper surface of which a part is located on an optical path during light irradiation and configured to hold the sample during the light irradiation,
wherein the sample holding unit includes a recess recessed in an upper surface direction outside a light irradiation area of the upper surface.

(12)
A microfluidic device, including:
a sample holding chamber; and
at least one flow path coupled to the sample holding chamber configured to supply liquid into the sample holding chamber,
wherein the sample holding chamber includes:
a first inner surface; and
a light irradiation region intersecting the first inner surface and configured to receive light from outside of the sample holding chamber to irradiate liquid inside the sample holding chamber,
wherein the first inner surface includes at least one recess shaped so as to contain gas bubbles present within the liquid, and
wherein the at least one recess is located outside of the light irradiation region.

(13)
The microfluidic device according to claim (12), further including
a second inner surface opposing the first inner surface, wherein the light irradiation region also intersects the second inner surface.

(14)
The microfluidic device according to claim (13),
wherein a portion of the first inner surface intersecting the light irradiation region and the second inner surface are separated by a first distance, and wherein a portion of the at least one recess and the second inner surface are separated by a second distance from the second inner surface, the second distance being greater than the first distance.

(15)
The microfluidic device according to any of (14),
wherein the first and second inner surfaces meet, thereby defining a perimeter around sides of the sample holding chamber, and wherein the sample holding chamber is widest at said perimeter.

(16)
The microfluidic device according to any of (12) to (15),
wherein the sample holding chamber is formed by joining a first substrate having the first inner surface and a second substrate having the second inner surface.

(17)
The microfluidic device according to any of (12) to (16),
wherein the first and second substrates are joined with a layer of adhesive.

(18)
The microfluidic device according to any of (12) to (17),
wherein the at least one recess is recessed in an opposite direction to a gravity direction.

(19)
The microfluidic device according to any of (12) to (18),
wherein the at least one flow path has a width of 1 mm or less.

(20)
The microfluidic device according to any of (12) to (19),
wherein the sample holding chamber comprises a plastic-based resin and/or a silicon-based resin.

(21)
The microfluidic device of claim according to any of (12) to (20), further including
a microchip, wherein the microchip includes the sample holding chamber and at least one flow path.

(22)

The microfluidic device of claim according to any of (12) to (21), wherein the at least one recess has a diameter between 0.5 mm and 3 mm.

(23)

An analysis apparatus, including:

at least one light source;

a microchip; and an optical control mechanism configured to guide light from the at least one light source onto the microchip, wherein the microchip comprises:

a sample holding chamber; and at least one flow path connected to the sample holding chamber configured to supply liquid into the sample holding chamber, wherein the sample holding chamber includes:

a first inner surface; and a light irradiation region intersecting the first inner surface and configured to receive light from the at least one light source to irradiate liquid inside the sample holding chamber, wherein the first inner surface includes at least one recess shaped so as to contain gas bubbles present within the liquid, and wherein the at least one recess is located outside of the light irradiation region.

(24)

The analysis apparatus according to (23), wherein the sample holding chamber further comprises a second inner surface opposing the first inner surface, wherein the light irradiation region also intersects the second inner surface.

(25)

The analysis apparatus according to (24), wherein the first inner surface and the second inner surface are separated by a first distance, and wherein the at least one recess includes a portion a second distance from the second inner surface, the second distance being greater than the first distance.

(26)

The analysis apparatus according to (25), wherein the first and second inner surfaces meet, thereby defining a perimeter around sides of the sample holding chamber, and wherein the sample holding chamber is widest at said perimeter.

(27)

The analysis apparatus according to any of (23) to (26), wherein the sample holding chamber is formed by joining a first substrate having the first inner surface and a second substrate having the second inner surface.

(28)

The analysis apparatus according to any of (23) to (27), wherein the first and second substrates are joined with a layer of adhesive.

(29)

The analysis apparatus according to any of (23) to (28), wherein the at least one flow path has a width of 1 mm or less.

(30)

The analysis apparatus according to any of (23) to (29), wherein the sample holding chamber comprises a plastic-based resin and/or a silicon-based resin.

(31)

The analysis apparatus according to any of (23) to (30), wherein the at least one recess has a diameter between 0.5 mm and 3 mm.

(32)

A microfluidics analysis method, including:

guiding light from at least one light source onto a microchip, the microchip including;

a sample holding chamber including a first inner surface; and at least one flow path connected to the sample holding chamber; and delivering liquid into the sample holding chamber via the at least one flow path, wherein the guided light is directed to a light irradiation region intersecting the first inner surface of the sample holding chamber, wherein the first inner surface includes at least one recess shaped so as to contain gas bubbles present within the liquid, and wherein the at least one recess is located outside of the light irradiation region.

(33)

A method of manufacturing a microfluidic device, including:

obtaining a first substrate having a first inner surface;

obtaining a second substrate having a second inner surface; and attaching the first substrate to the second substrate thereby forming a sample holding chamber, wherein the sample holding chamber includes at least one outlet for delivering liquid into the sample holding chamber, wherein the sample holding chamber includes a light irradiation region intersecting the first inner surface and configured to receive light from outside of the sample holding chamber to irradiate liquid inside the sample holding chamber, wherein the first inner surface includes at least one recess shaped so as to contain gas bubbles present within the liquid, and wherein the at least one recess is located outside of the light irradiation region.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1 microchip
11 sample holding unit
12 adhesion layer
13 flow path
10 analysis apparatus
101 light irradiation unit
102 optical control mechanism
103 light detection unit

The invention claimed is:

1. A microfluidic device, comprising:
a sample holding chamber; and
at least one flow path coupled to the sample holding chamber and configured to supply liquid into the sample holding chamber,
wherein the sample holding chamber includes:
a first inner surface;
a light irradiation region intersecting the first inner surface and configured to receive light from outside of the sample holding chamber to irradiate liquid inside the sample holding chamber;

a recess arranged at a terminus of the first inner surface and shaped so as to contain gas bubbles present within the liquid, the recess comprising an interior inner surface, wherein the recess is located outside of the light irradiation region, and wherein an opening of the recess is wider than the interior inner surface of the recess;

a second inner surface opposing the first inner surface, wherein the light irradiation region also intersects the second inner surface; and a side wall arranged adjacent to the recess and adjacent to the second inner surface, wherein the side wall slopes away from the second inner surface.

2. The microfluidic device of claim 1, wherein the sample holding chamber is formed by joining a first substrate having the first inner surface and a first portion of the side wall and a second substrate having the second inner surface and a second portion of the side wall.

3. The microfluidic device of claim 2, wherein the first and second substrates are joined with a layer of adhesive.

4. The microfluidic device of claim 1, wherein the recess is recessed in an opposite direction to a gravity direction.

5. The microfluidic device of claim 1, wherein the at least one flow path has a width of 1 mm or less.

6. The microfluidic device of claim 1, wherein the sample holding chamber comprises a plastic-based resin and/or a silicon-based resin.

7. The microfluidic device of claim 1, further comprising a microchip, wherein the microchip includes the sample holding chamber and the at least one flow path.

8. The microfluidic device of claim 1, wherein the interior inner surface of the recess has a width between 0.5 mm and 3 mm.

9. The microfluidic device of claim 1, wherein the recess tapers from the opening of the recess to the interior inner surface of the recess.

10. An analysis apparatus, comprising:
at least one light source;
a microchip; and
an optical control mechanism configured to guide light from the at least one light source onto the microchip,
wherein the microchip comprises:
a sample holding chamber; and
at least one flow path connected to the sample holding chamber and configured to supply liquid into the sample holding chamber,
wherein the sample holding chamber includes:
a first inner surface;
a light irradiation region intersecting the first inner surface and configured to receive light from the at least one light source to irradiate liquid inside the sample holding chamber;
a recess arranged at a terminus of the first inner surface and shaped so as to contain gas bubbles present within the liquid, the recess comprising an interior inner surface, wherein the recess is located outside of the light irradiation region, and wherein an opening of the recess is wider than the interior inner surface of the recess;
a second inner surface opposing the first inner surface, wherein the light irradiation region also intersects the second inner surface; and
a side wall arranged adjacent to the recess and adjacent to the second inner surface, wherein the side wall slopes away from the second inner surface.

11. The analysis apparatus of claim 10, wherein the sample holding chamber is formed by joining a first substrate having the first inner surface and a first portion of the side wall and a second substrate having the second inner surface and a second portion of the side wall.

12. The analysis apparatus of claim 11, wherein the first and second substrates are joined with a layer of adhesive.

13. The analysis apparatus of claim 10, wherein the at least one flow path has a width of 1 mm or less.

14. The analysis apparatus of claim 10, wherein the sample holding chamber comprises a plastic-based resin and/or a silicon-based resin.

15. The analysis apparatus of claim 10, wherein the interior inner surface of the recess has a width between 0.5 mm and 3 mm.

16. A microfluidics analysis method, comprising:
guiding light from at least one light source onto a microchip, the microchip comprising:
a sample holding chamber including:
a first inner surface;
a recess arranged at a terminus of the first inner surface and shaped so as to contain gas bubbles present within the liquid, the recess comprising an interior inner surface and having an opening;
a second inner surface opposing the first inner surface, wherein a light irradiation region intersects the first inner surface and the second inner surface; and
a side wall arranged adjacent to the at least one recess and adjacent to the second inner surface, wherein the side wall slopes away from the second inner surface; and
at least one flow path connected to the sample holding chamber; and
delivering liquid into the sample holding chamber via the at least one flow path,
wherein the guided light is directed to the light irradiation region intersecting the first inner surface and the second inner surface of the sample holding chamber,
wherein the recess is located outside of the light irradiation region, and
wherein the opening of the recess is wider than the interior inner surface of the recess.

17. A method of manufacturing a microfluidic device, comprising:
obtaining a first substrate having a first inner surface;
obtaining a second substrate having a second inner surface; and
attaching the first substrate to the second substrate thereby forming a sample holding chamber,
wherein the sample holding chamber includes:
at least one outlet for delivering liquid into the sample holding chamber,
a light irradiation region intersecting the first inner surface and configured to receive light from outside of the sample holding chamber to irradiate liquid inside the sample holding chamber,
a recess arranged at a terminus of the first inner surface and shaped so as to contain gas bubbles present within the liquid, the recess comprising an interior inner surface, wherein the recess is located outside of the light irradiation region, and wherein an opening of the recess is wider than the interior inner surface of the recess;
the second inner surface opposing the first inner surface, wherein the light irradiation region also intersects the second inner surface; and a side wall arranged adjacent to the at least one recess and adjacent to the second inner surface, wherein the side wall slopes away from the second inner surface.

\* \* \* \* \*